June 2, 1925.  
P. E. BARKER  
DUMP TRUCK  
Filed Oct. 24, 1921  
1,540,527  
2 Sheets-Sheet 1
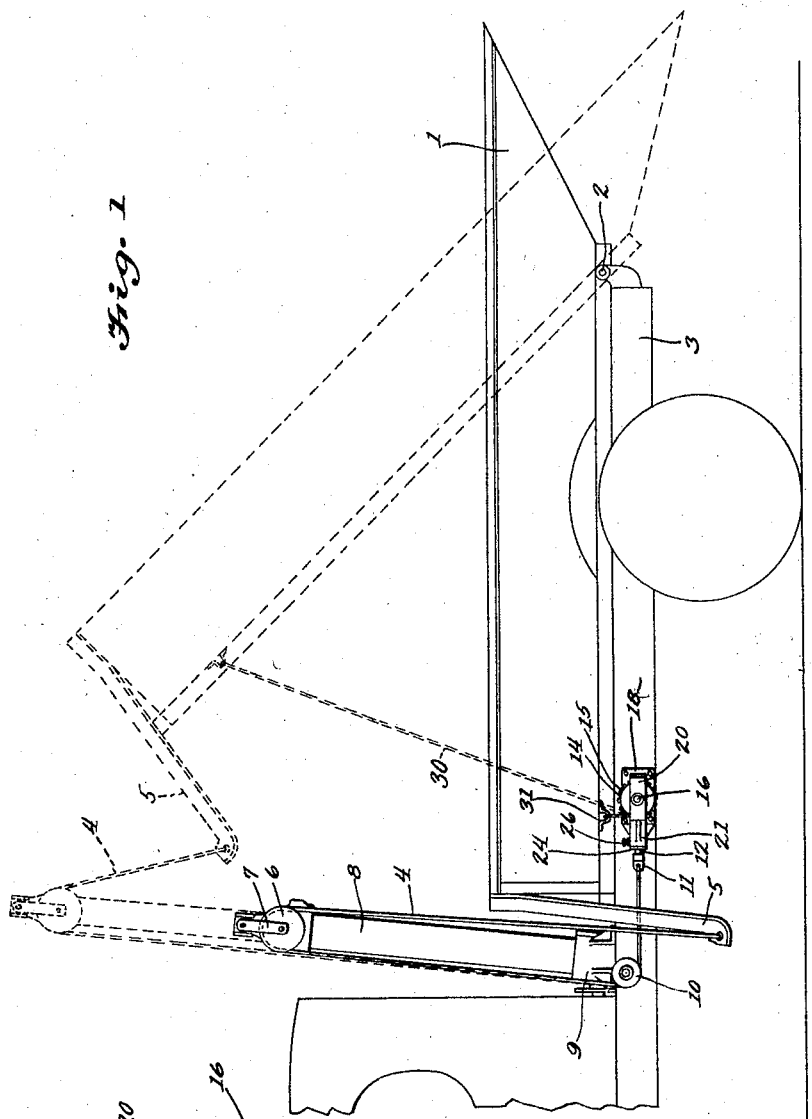
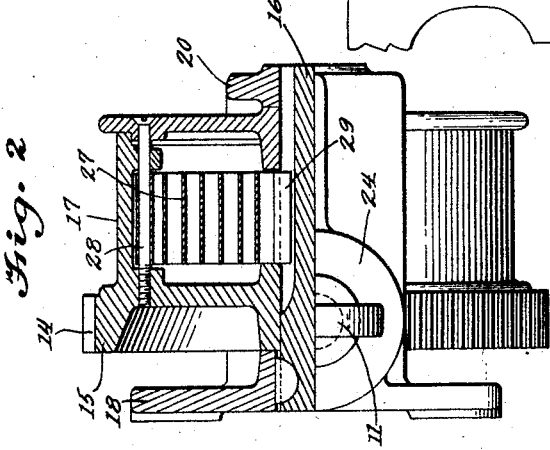
INVENTOR  
Percy E. Barker  
BY Brockett & Hyde  
ATTYS

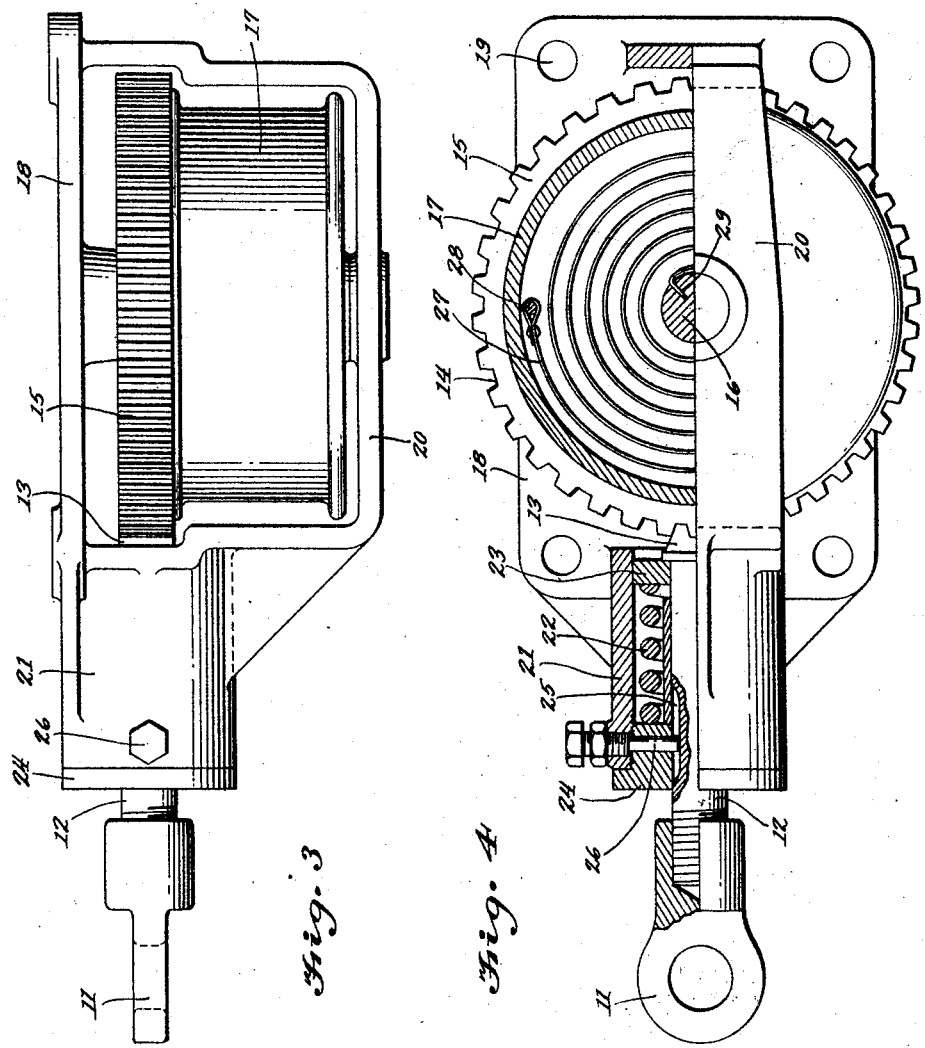

Patented June 2, 1925.

1,540,527

UNITED STATES PATENT OFFICE.

PERCY E. BARKER, OF CLEVELAND, OHIO, ASSIGNOR TO THE VAN DORN IRON WORKS COMPANY, OF CLEVELAND, OHIO, A CORPORATION OF OHIO.

DUMP TRUCK.

Application filed October 24, 1921. Serial No. 509,922.

*To all whom it may concern:*

Be it known that I, PERCY E. BARKER, a citizen of the United States, residing at Cleveland, in the county of Cuyahoga and State of Ohio, have invented certain new and useful Improvements in Dump Trucks, of which the following is a specification.

This invention relates to improvements in dump truck mechanism.

The objects of this invention are to provide means for preventing improper swinging of a dump truck body as might otherwise be caused by sudden sliding movement of a compact mass of material, as for instance, frozen garbage or the like, when the truck body has been tilted to a certain degree; and more specifically to provide means for automatically locking the truck body against any such improper swinging movement of the truck body as soon as such movement is initiated; and in this way to maintain the hoisting mechanism in proper operative condition by preventing undue strain and disturbing influences thereupon.

Other objects of this invention will appear from the following description and claims when considered together with the accompanying drawings.

Fig. 1 shows in elevation a dump truck with my invention applied thereto; Fig. 2 is a front elevation, partly broken away, of the snubber attachment; Fig. 3 is a plan view of the snubber attachment; and Fig. 4 is a side view, partly in section and partly in elevation, of the same attachment.

The dump truck body 1 is pivotally mounted at 2 upon the supporting frame or chassis indicated in a general way at 3 and is adapted to be raised and lowered by means of any suitable hoisting mechanism. As here illustrated, a cable 4 is attached at one end to the depending arm 5 on the front end of the truck body and engages a sheave 6 carried by an arm indicated in a general way at 7 and adapted for straight line upward projection by the hoisting mechanism. The casing for such mechanism is indicated at 8 and is supported in the base casting 9 mounted upon the chassis 3.

In my improved device, instead of anchoring the other end of the cable 4 to the chassis of the truck, it is led about the idler 10 and is attached to the eye member 11 which has screw threaded engagement with the rod or stem 12 carrying at its other end the locking tooth 13 for engagement in the recesses 14 provided in the periphery of the disc 15, which is fixed to the windlass 17 for free movement on the fixed shaft 16. The shaft 16 is mounted at one end on the bracket 18, which is adapted for attachment to the body of the chassis by means of the bolt holes 19, while its other end is hung in the bracket arm 20 extending from the main bracket 18. The housing 21, which is a continuation of the main bracket, encloses a spiral spring 22, which has abutment at its one end against the disc 23 carried by the stem 12, while the other end of the spring has abutment against the screw threaded plug 24, which closes the end of the casing 21. The rod 12, which might be considered a plunger rod, is adapted to work through the screw plug 24, as clearly indicated in the drawings. The rod 12 is provided with a slot 25 into which extends the removable pin 26 projecting through the wall of the casing 21, as well as through the screw plug 24. The pin 26 not only limits the rod 12 to straight line movement, but also prevents accidental removal of the screw plug 24.

The windlass 17 is provided with the coil spring 27 on the inside thereof, its one end being anchored to the body of the windlass, as indicated at 28, while its other end is anchored to the fixed shaft 16, as indicated at 29. A pay-out line 30 is attached at one end to an eye member 31, which is provided on the underside of the truck body, while the other end of the line 30 is attached, in any suitable manner, to the outside of the windlass so as to be coiled thereabout. The spring 27 normally tends to wind the line 30 about the windlass 17.

From the above it will be seen that when the truck body is properly raised so as to maintain the cable 4 in a taut condition, the rod 12 will be pulled outwardly against the tension of the spring 27 so as to release the tooth 13 from engagement with the notched disc 15. When this condition exists, that is, so long as the cable 4 is maintained in a taut condition, the line 30 is free to be paid out from the windlass as the truck body is raised. But should any undue swinging or swaying motion of the truck body be even initiated, as for instance by the sudden sliding or discharge therefrom of a compact mass, as for instance, frozen garbage or the like, so as to cause a slight slackening of the cable 4, the tooth 13 will then automatically and at once return under tension of the spring 22 to engage a recess in the disc 15 and prevent paying out of the line 30. Thus the truck body is prevented from being unduly swung by such a sudden discharge of material since it is at once held in check against movement by stopping of the pay-out line 30, which then restrains the truck body. As soon as the cable 4 resumes normal taut condition, the paying out of the line 30 may be continued so as to raise the truck body to the full elevation desired in case such elevation has not already been attained.

My improved device avoids the danger of the hoisting cable being displaced from its sheaves or any of the parts being subjected to undue strain which might otherwise be caused by swaying and jerking movements of the truck body. Furthermore, this device can be readily applied as an attachment to dump trucks now on the market with comparatively little cost.

What I claim is:

1. In a dump truck mechanism, the combination of a supporting frame, a load receiving body mounted upon said frame for raising and lowering movement, means for raising and lowering said body, and means controlled by the body for ensuring against improper upward movement of said body, improper movement of said body being adapted to initiate effective operation of said ensuring means.

2. In a dump truck mechanism, the combination of a supporting frame, a load receiving body mounted upon said frame for raising and lowering movement, means for raising and lowering said body, and means controlled by movement of the body for positively locking said body against movement so as to insure against improper upward movement of said body.

3. In a dump truck mechanism, the combination of a supporting frame, a load receiving body mounted upon said frame for raising and lowering movement, means for raising and lowering said body, and means normally ineffective upon said body for automatically and positively arresting the abnormal tilting movement thereof.

4. In a dump truck mechanism, the combination of a supporting frame, a load receiving body mounted upon said frame for raising and lowering movement, means for raising and lowering said body including a cable, and means controlled by slack condition of said cable for automatically preventing improper swinging movement of said body during the raising of the same.

5. In a dump truck mechanism, the combination of a supporting frame, a load receiving body mounted upon said frame for raising and lowering movement, means for raising and lowering said body, said means including a cable, a pay-out line connected to said body, and means controlled by slack condition of said cable for regulating the paying out of said line.

6. In a dump truck mechanism, the combination of a supporting frame, a load receiving body mounted upon said frame for raising and lowering movement, means for raising and lowering said body, said means including a cable, a pay-out line connected to said body, means for locking said pay-out line against movement, and means controlled by slack condition of said cable for automatically actuating said locking means.

7. In a dump truck mechanism, the combination of a supporting frame, a load receiving body mounted upon said frame for raising and lowering movement, means for raising and lowering said body, said means including a cable, a pay-out line connected to said body, a windlass for said line, means for locking said windlass against paying out of the line, and operative connection between said cable and locking means whereby the windlass is released for operation only when the cable is taut.

8. An attachment for dump truck mechanism comprising a windlass for coiling a pay-out line thereupon, a ratchet member carried by said windlass, a pawl for releasable locking engagement with said ratchet member, a spring normally forcing said pawl into locking engagement, and an operating member for said pawl adapted for attachment to a part of a hoisting mechanism for control thereby.

9. In a dump truck mechanism, the combination of a supporting frame, a load receiving body mounted upon said frame for raising and lowering movement, means for raising and lowering said body, yielding means for permitting raising movement of said body with retardation, and additional means for positively stopping the body when abnormal raising thereof occurs.

10. In a dump truck mechanism, the combination of a supporting frame, a load receiving body mounted upon said frame for raising and lowering movement, means for raising and lowering said body, yielding means for permitting raising movement of said body with retardation, and additional means controlled by said raising movement of the body for positively stopping the body when abnormal raising thereof occurs.

11. In a dump truck mechanism, the combination of a supporting frame, a load receiving body mounted upon said frame for raising and lowering movement, means for raising and lowering said body with retardation, yielding means for permitting raising movement of said body, and additional means controlled by said raising and lowering means for positively stopping the body when abnormal raising movement thereof occurs.

12. In a dump truck mechanism, the combination of a supporting frame, a load receiving body mounted upon said frame for raising and lowering movement, yielding means normally effective upon said body for permitting its raising movement with retardation, means for raising and lowering said body, and means for positively arresting raising movement of the body and rendering said yielding means ineffective thereupon when abnormal raising movement of said body occurs.

13. In a dump truck mechanism, the combination of a supporting frame, a load receiving body mounted upon said frame for raising and lowering movement, a yielding movable member normally effective to permit retarded raising movement of said body during a full rise thereof, and means adapted upon abnormal rising movement of said body and in any position thereof to lock said yielding movable member immovable.

14. In a dump truck mechanism, the combination of a supporting frame, a load receiving body mounted upon said frame for raising and lowering movement, a rotatable yielding winding drum operatively connected to said body and adapted to permit raising movement with retardation, means for raising and lowering said body, and means for locking said winding drum against rotation whenever the body tends to rise abnormally.

15. In a dump truck mechanism, the combination of a supporting frame, a load receiving body mounted upon said frame for raising and lowering movement, means for raising said body and arranged to permit said body to freely rise ahead of said raising means and thereby relieve itself from the effect of said raising means, and additional means for arresting raising movement of the body when such movement occurs.

16. In a dump truck mechanism, the combination of a supporting frame, a load receiving body mounted upon said frame for raising and lowering movement, means for raising and lowering said body, and means controlled by abnormal raising movement of the body for temporarily preventing effective operation of said raising means.

17. In a dump truck mechanism, the combination of a supporting frame, a load receiving body mounted upon said frame for raising and lowering movement, means for raising and lowering said body, and means controlled by abnormal movement of the body for permitting raising movement of said body only during normal raising operation of the same.

In testimony whereof I hereby affix my signature.

PERCY E. BARKER.